United States Patent [19]

Hope et al.

[11] 4,156,970
[45] Jun. 5, 1979

[54] APPARATUS FOR AREA MEASUREMENT OF ELONGATED STRIPS

[76] Inventors: Henry F. Hope; Stephen F. Hope, both of 2421 Wyandotte Rd., Willow Grove, Pa. 19090

[21] Appl. No.: 823,986

[22] Filed: Aug. 12, 1977

[51] Int. Cl.$^2$ ............................................. G01B 7/32
[52] U.S. Cl. ................................... 33/123; 33/132 R; 33/141.5
[58] Field of Search ............... 33/123, 124, 121, 129, 33/141.5, 133, 132

[56] References Cited

U.S. PATENT DOCUMENTS

| | | | |
|---|---|---|---|
| 608,538 | 8/1898 | Ayer | 33/124 |
| 674,953 | 5/1901 | Beals | 33/123 |
| 2,360,594 | 10/1944 | Stout et al. | 33/123 |
| 3,717,414 | 2/1973 | Hall et al. | 33/123 |
| 3,732,625 | 5/1973 | Vernooy | 33/141.5 |
| 4,024,645 | 5/1977 | Giles | 33/129 |

Primary Examiner—William D. Martin, Jr.
Attorney, Agent, or Firm—Zachary T. Wobensmith, 2nd; Zachary T. Wobensmith, III

[57] ABSTRACT

Apparatus for area measurement of elongated strips of different widths is described, which strips may be film to be treated, the strips to be measured being delivered manually or driven between rolls carried on parallel shafts, the number of rolls on one shaft which are actuated being determined by the width of the strips, the actuation rolls having magnets carried therein to activate switches to generate pulses for counting by a counter to give an area indication. The actuation rolls are preferably counterbalanced to reduce undesired movement.

6 Claims, 5 Drawing Figures

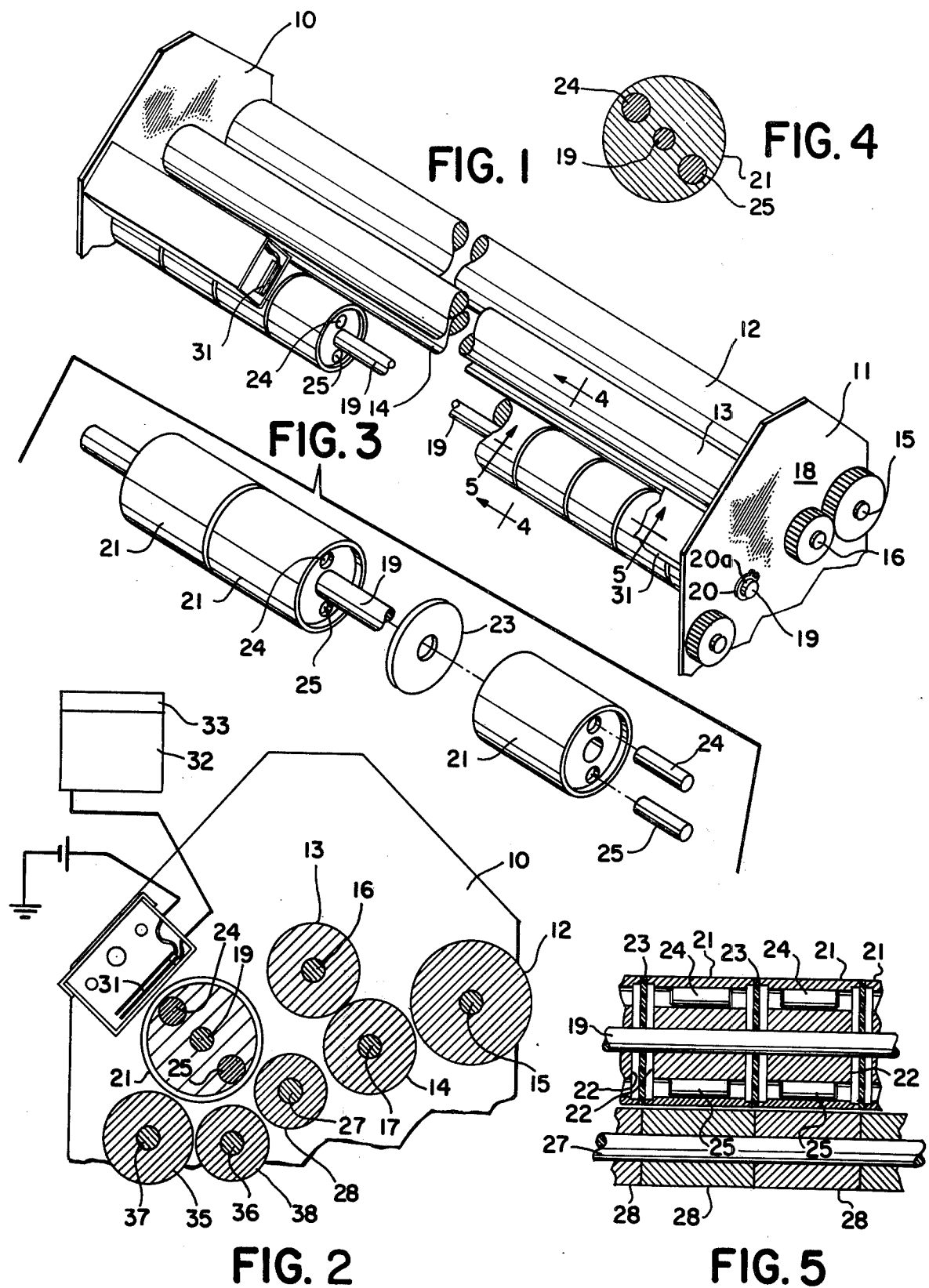

APPARATUS FOR AREA MEASUREMENT OF ELONGATED STRIPS

BACKGROUND OF THE INVENTION

1. Field of the Invention

This invention relates to apparatus for measuring area of elongated strip materials.

2. Brief Description of the Prior Art

It has heretofore been proposed in the U.S. Patents to Gotz, No. 981,552 and Bright, No. 741,881, to measure the area of static non-conducting objects such as leather and hides by the use of electrically conducting pins which are energized except where the object is interposed, in Gotz the area as a measure of current strength being read in terms of area on a measuring instrument while in Bright an electrical single impulse adder is employed.

Machines have also been proposed for measuring areas of moving strips. The U.S. Patents to Sawyer, No. 269,962, Beals, No. 674,953 and Thomson, No. 730,491 show various mechanical adding systems to operate area indicators.

McFall, in U.S. Pat. No. 1,567,965 shows a leather measuring machine in which an electrically actuated clutch is employed in a mechanical adding system.

The area measuring apparatus for measuring strips are relatively complex and subject to operating difficulties in use.

SUMMARY OF THE INVENTION

In accordance with the invention area measuring apparatus for elongated strips is provided which comprises a plurality of aligned rolls with magnets carried therein, the number of rolls which are actuated being determined by the width of the strip, magnetically responsive switches for each of the rolls being actuated upon each roll revolution to provide pulses for accumulation in a counter for area indication, the rolls each being counterbalanced, and the magnets being disposed to avoid magnetic interference.

It is the principal object of the invention to provide area measuring apparatus for elongated strips which may be of varying widths, which is simple in construction, compact, provides pulses representative of areas in an effective manner for counting and area indication.

It is a further object of the invention to provide area measuring apparatus which can be readily incorporated in equipment for strip treatment.

Other objects and advantageous features of the invention will be apparent from the description and claims.

BRIEF DESCRIPTION OF THE DRAWING

The nature and characteristic features of the invention will be more readily understood from the following description taken in connection with the accompanying drawings forming part hereof in which:

FIG. 1 is a view in perspective of pulse generating portions of area measuring apparatus in accordance with the invention mounted in a strip processing machine;

FIG. 2 is a transverse sectional view of the structure shown in FIG. 1, and having a pulse counter and area indicator connected thereto;

FIG. 3 is an exploded perspective view of the row of pulse generating rolls;

FIG. 4 is a transverse sectional view taken approximately on the line 4—4 of FIG. 1; and FIG. 5 is a fragmentary longitudinal sectional view taken approximately on the line 5—5 of FIG. 1.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF A PREFERRED EMBODIMENT

Referring now more particularly to the drawings end frames 10 and 11 are shown, of any suitable material, such as metal or plastic, of sufficient strength and resistant to chemicals and liquids to which they may be exposed in use.

The end frames 10 and 11 are held in separated relation by frame rods (not shown) or in any other desired manner.

A plurality of infeed rollers 12, 13 and 14 mounted on shafts 15, 16 and 17 can be provided, carried by the end frames 10 and 11. The roller 12 serves merely as a guide roller while the rollers 13 and 14 can serve as nip or feed rollers for positive feed of the strip material the area of which is to be measured. The rollers 12, 13 and 14 can be driven in any suitable manner, such as by an externally disposed gear drive 18 actuated in any desired manner.

The structure for area measurement preferably includes a shaft 19 carried in the end frames 10 and 11, and retained therein in any desired manner at each end, such as by a clip 20 engaged in a slot 20a in the shaft 19. The shaft 19 is preferably a metal rod having a plurality of rolls 21 freely rotatable thereon and without any drag of one roll 21 on an adjoining roll 21. The number of rolls 21 will be varied in accordance with the maximum width of the elongated strip to be measured. The rolls 21 can be of any desired material such as synthetic plastic or rubber with dished ends 22 to reduce the end areas for contact. Spacer washers 23 can be interposed between the dished ends 22.

Each of the rolls 21 has carried therein a magnet 24, metal or ceramic, and preferably longitudinally axially disposed between the shaft 20 and the periphery of the roll 21. The magnets 24 are preferably of a length and intensity to avoid any attraction or repulsion of magnets 24 in adjoining rolls 21.

Each of the rolls 21, diametrically opposite to the magnet 24 preferably has a counterweight 25 to balance the weight of the magnet 24 and thereby avoid the application of rotational force on the roll 21 because of the weight of the magnet 24.

A shaft 27 is provided, carried in the end frames 10 and 11 and has freely rotatably mounted thereon a plurality of rolls 28 preferably the same in number and of the same material as the rolls 21, with their peripheries closely spaced or in contact with the peripheries of the rolls 21, the spacing depending on the thickness of the strip to be measured.

A mounting bracket 30 is provided which carries a plurality of individual encapsulated magnetically operated reed switches 31, one for each roll 21 to provide, upon actuation of each switch, a pulse for delivery to a pulse counter 32 for summation of pulses from the switches 31, with a numeral readout 33.

Delivery rollers 35 and 36 on driven shafts 37 and 38 may be provided for delivery of the strip for processing.

The mode of operation will now be pointed out.

The elongated strips, the area of which is to be measured may be of the same or different widths, or may be a composite of strips of different widths secured together as a continuous strip.

The strip introduced over the roller 12 and between the rollers 13 and 14 is delivered for measurement.

The strip passes between the rolls 21 and 28, and, dependent upon its width, causes one or more rolls 21 to be rotated. For example, if the strip is of a width equal to or slightly less than the length of three rolls 21 then those rolls 21 will be rotated.

Rotation of rolls 21 is effective through the rotary movement of the roll to actuate the corresponding reed switches 31 to deliver a pulse to the counter 32 for summation with other pulses to give an area measurement.

We claim:

1. Apparatus for measurement of area of elongated strips and sheets of different width which comprises positive strip feeding members for delivery of strips and sheets to be measured, a shaft, a plurality of roll members mounted on said shaft for independent rotation thereon, each of said roll members having an activating portion in close proximity to the periphery of the roll member movable with the roll member, said activating portions being so constructed and arranged to avoid interference between activating portions in adjoining roll members, guide means for retaining the strip or sheet in engagement with said roll members as determined by the width of the strip or sheet, and fixedly mounted members beyond the periphery of each of said roll members responsive to movement of said activating portions for pulse delivery upon respective movement of said activating portions by a strip or sheet in engagement with said roll members as determined by the strip or sheet length and width.

2. Apparatus as defined in claim 1 in which said activating portions are magnets.

3. Apparatus as defined in claim 2 in which said members responsive to said activating portions are magnetic responsive members.

4. Apparatus as defined in claim 1 in which said guide means comprises a second shaft parallel to said first mentioned shaft, and at least one roll on said second shaft.

5. Apparatus as defined in claim 1 in which said members for pulse delivery are reed switches.

6. Apparatus as defined in claim 1 in which each of said activating portions is a magnet, and each of said roll members has a portion for counterbalancing the weight of its magnet.

* * * * *